(12) United States Patent
Lokman et al.

(10) Patent No.: US 10,574,595 B2
(45) Date of Patent: Feb. 25, 2020

(54) SYSTEM AND METHOD FOR ELASTIC SCALING OF VIRTUALIZED NETWORK FUNCTIONS OVER A SOFTWARE DEFINED NETWORK

(71) Applicant: ARGELA YAZILIM VE BILISIM TEKNOLOJILERI SAN. VE TIC. A.S., Istanbul (TR)

(72) Inventors: Erhan Lokman, Istanbul (TR); Onur Koyuncu, Istanbul (TR); Erol Ozcan, Istanbul (TR); Sinan Tatlicioglu, Istanbul (TR); Seyhan Civanlar, Istanbul (TR)

(73) Assignee: Argela Yazilim ve Bilisim Teknolojileri San. ve Tic. A.S., Istanbul (TR)

( * ) Notice: Subject to any disclaimer, the term of this patent is extended or adjusted under 35 U.S.C. 154(b) by 104 days.

(21) Appl. No.: 15/718,861

(22) Filed: Sep. 28, 2017

(65) Prior Publication Data
US 2019/0097946 A1 Mar. 28, 2019

(51) Int. Cl.
| | |
|---|---|
| *H04L 12/66* | (2006.01) |
| *H04L 12/947* | (2013.01) |
| *G06F 9/455* | (2018.01) |
| *H04L 12/715* | (2013.01) |
| *H04L 12/725* | (2013.01) |
| *H04L 12/721* | (2013.01) |

(52) U.S. Cl.
CPC .......... *H04L 49/25* (2013.01); *G06F 9/455* (2013.01); *H04L 12/66* (2013.01); *H04L 45/306* (2013.01); *H04L 45/64* (2013.01); *H04L 45/12* (2013.01); *H04L 45/124* (2013.01)

(58) Field of Classification Search
None
See application file for complete search history.

(56) References Cited

U.S. PATENT DOCUMENTS

| | | | |
|---|---|---|---|
| 9,730,135 B1* | 8/2017 | Rahman | H04W 64/00 |
| 9,860,152 B2* | 1/2018 | Xia | H04L 43/12 |
| 2014/0229945 A1* | 8/2014 | Barkai | H04L 49/70 718/1 |
| 2014/0317293 A1* | 10/2014 | Shatzkamer | G06F 9/455 709/226 |
| 2015/0063166 A1* | 3/2015 | Sif | G06F 9/45558 370/254 |
| 2016/0080263 A1 | 3/2016 | Park et al. | |

(Continued)

*Primary Examiner* — Kodzovi Acolatse
(74) *Attorney, Agent, or Firm* — IP Authority, LLC; Ramraj Soundararajan

(57) ABSTRACT

When network function virtualization (NFV) is overlaid on top of a SDN, a convergence gateway mediates between the orchestrator and the SDN controller. The convergence gateway collects from the orchestrator the information on the location, capacity, status, and usage information of all virtualized functions that run on SDN's physical platforms, and passes that information to the controller. The controller decides to optimally route a data flow for service chaining by obeying traffic engineering and quality of service policies of that data flow, choosing from available virtualized functions along that route. An information model based approach is also presented for information sharing across the orchestrator, convergence gateway and controller.

4 Claims, 8 Drawing Sheets

(56) References Cited

U.S. PATENT DOCUMENTS

| | | | | |
|---|---|---|---|---|
| 2016/0149788 | A1* | 5/2016 | Zhang | H04L 43/10 |
| | | | | 709/224 |
| 2016/0205519 | A1* | 7/2016 | Patel | H04L 67/1002 |
| | | | | 455/518 |
| 2016/0366023 | A1* | 12/2016 | Higgins | H04L 41/12 |
| 2017/0104609 | A1* | 4/2017 | McNamee | H04L 12/4641 |
| 2017/0230242 | A1* | 8/2017 | Hammer | H04L 41/0806 |
| 2018/0191607 | A1* | 7/2018 | Kanakarajan | G06F 9/5077 |
| 2018/0302343 | A1* | 10/2018 | Lokman | H04L 49/70 |
| 2019/0045357 | A1* | 2/2019 | Cooper | H04W 8/26 |
| 2019/0052549 | A1* | 2/2019 | Duggal | H04L 41/5045 |

\* cited by examiner

SYSTEM AND METHOD FOR ELASTIC SCALING OF VIRTUALIZED NETWORK FUNCTIONS OVER A SOFTWARE DEFINED NETWORK

BACKGROUND OF THE INVENTION

Field of Invention

The present invention relates to a system and a method designed for real-time capacity shifting of Virtualized Network Functions (VNFs) over a Software Defined Network (SDN) according to traffic needs.

Discussion of Related Art

Any discussion of the prior art throughout the specification should in no way be considered as an admission that such prior art is widely known or forms part of common general knowledge in the field.

Network Function Virtualization (NFV) decouples network functions from the underlying hardware so that they run as software images on commercial off-the-shelf and purpose-built hardware. It does so by using standard virtualization technologies (networking, computation, and storage) to virtualize the network functions. The objective is to reduce the dependence on dedicated, specialized physical devices by allocating and using the physical and virtual resources only when and where they are needed. With this approach, service providers can reduce overall costs by shifting more components to a common physical infrastructure while optimizing its use, allowing them to respond more dynamically to changing market demands by deploying new applications and services as needed. The virtualization of network functions also enables the acceleration of time to market for new services because it allows for a more automated and streamlined approach to service delivery. NFV uses all physical network resources as hardware platforms for virtual machines on which a variety of network-based services can be activated and deactivated on an as needed basis. An NFV platform runs on an off-the-shelf multi-core hardware and is built using software that incorporates carrier-grade features. The NFV platform software is responsible for dynamically reassigning VNFs due to failures and changes in traffic loads, and therefore plays an important role in achieving high availability.

Typical Virtualized Network Functions (VNF) that emulate an enterprise's Customer Premises Equipment (CPE) capabilities within the core network are VPN termination, Deep Packet Inspection (DPI), Load Balancing, Network Address Translation (NAT), Firewall (FW), QoS, email, web services, and Intrusion Prevention System (IPS), just to name a few. These are functions typically deployed today within or at the edges of an enterprise network on dedicated hardware/server infrastructure where it may be more appropriate for a service provider to deliver as virtualized network functions. The general principles of such virtualization can increase flexibility by sharing resources across many enterprises and decrease setup and management costs.

A key software component called 'orchestrator', which provides management of the virtualized services is responsible for onboarding of new network services and virtual network function packages, service lifecycle management, global resource management, and validation and authorization of NFV resource requests. Orchestrator must communicate with the underlying NFV platform to instantiate a service. It performs other key functions such as:

Replicating services to scale;
Finding and managing sufficient resources to deliver the service;
Tracking performance to make sure they are adequate.

Orchestrator can remotely activate a collection of virtual functions on a network platform. ETSI provides a comprehensive set of standards defining NFV Management and Orchestration (MANO) interface in various standards documents. For example, the Orchestrator to VNF interface is defined as the Ve-Vnfm interface. There are several other interfaces that tie NVF to the Operations Systems (OSS) and Business Systems (BSS) systems. All of these interfaces and their functions are publicly available in ETSI NVF Reference Architecture documents in ETSI's web pages.

In the past, servers that host the aforementioned services would physically connect to a hardware-based switch located in the data center. Later, with the advent of the concept of 'server virtualization' an access layer is created that changed the paradigm from having to be connected to a physical switch to being able to connect to a 'virtual switch'. This virtual switch is only a software layer that resides within a server that is hosting many virtual machines (VMs) on the same physical server. VMs, or containers, have logical or virtual Ethernet ports. These logical ports connect to a virtual switch. The Open vSwitch (OVS) is the commonly known access layer software that enables many VMs to run many VMs on a single physical server machine.

Programmable networks such as Software Defined Networks (SDN) provide yet another new physical network infrastructure in which the control and data layers are separated wherein the data layer is controlled by a centralized controller. The data layer is comprised of so-called 'switches' (also known as 'forwarders') that act as L2/L3 switches receiving instructions from the centralized 'controller' using a south-bound interface. OpenFlow is the most widely used communication protocol on this interface. Network Function Virtualization (NFV), in combination with Software Defined Networking (SDN) promises to help transform today's service provider networks. It will transform how they are deployed and managed, and the way services are delivered to customers. The goal is to enable service providers to reduce costs, increase business agility, and accelerate the time to market for new services.

While VNFs are instantiated, and managed by the Orchestrator according to MANO standards, the data flows between these VNFs and network elements (switches and hosts) are managed and controlled by the SDN controller. Therefore, the orchestrator and the controller essentially need to cooperate in delivering different aspects of the service to the users. For example, the forwarding actions applied to the packet flows to ensure that they not only travel through the switches towards a destination but also pass through certain virtualized functions deployed in the network in a specific order becomes the task of the controller. On the other hand, if a specific virtualized service runs out of capacity or can't be reached because of a network failure or congestion, activating a new service component becomes the task of the orchestrator. This patent application is primarily concerned with effective and rapid interactions between an orchestrator and controller in an SDN with many distributed VNFs for a real-time and elastic capacity shifting/scaling of virtualized functions.

A VNF Forwarding Graph is a prior-art concept defined in ETSI standards documents on NFV. It is the sequence of virtual network functions that packets need to traverse for service chaining. It essentially provides the logical connectivity across the network between virtual network functions.

An abstract network service based on a chain of VNFs must include identification and sequencing of different types of VNFs involved, and the physical relationship between those VNFs and the interconnection (forwarding) topology with those physical network functions such as switches, routers and links to provide the service. Some packet flows may need to visit specific destination(s) (e.g., a set of VNFs) before the final destination, while others may only have a final Internet destination without traversing any VNFs.

One of the key requirements to enable NFV over SDN is 'SDN association', which is simply the mapping between the virtualized functions and SDN's physical functions. Information modeling is one of the most efficient ways to model such mappings. Entries in that Information Model (IM) must capture the dynamically changing nature of the mappings between the virtual and physical worlds as new virtual machines are activated, and existing virtual machines become congested or down. Furthermore, it must enable the controller to determine forwarding graphs rapidly, and in concert with the orchestrator.

Modeling a network using object-oriented notation is well understood in prior art. For example, Common Information Model (CIM) developed by the Distributed Management Task Force (DMTF) has been gradually building up for over a decade and contains many object representations of physical network functions and services. To mention a few: network, switch, router, link, facility, server, port, IP address, MAC address, tag, controller as well as service-oriented objects such as user, account, enterprise, service, security service, policy, etc. Inheritance, association and aggregation are prior-art techniques used to link objects to one another. In addition to CIM, there are other similar prior art information models used to model networks and services.

The NFV over SDN must map a customer/enterprise's specific overall service requests to a single service or a chain of services (also known as service function chaining). It must further map the chain of services to specific virtualized network functions and those functions to specific physical platforms (switches, servers, etc.) on which the service will be provided. Fortunately, an information model such as CIM can provide the schema to model the proper mappings and associations, possibly without any proprietary extensions in the schema. This information model allows a comprehensive implementation within a relational database (e.g., Structured Query Language—SQL) or hierarchical directory (e.g., Lightweight Directory Access Protocol—LDAP), parts of which may be replicated and distributed across the controller, orchestrator and the system of invention called 'convergence gateway' according to an aspect of this invention. Doing so, the network control (SDN/controller) and service management (NFV/orchestrator) operate in complete synchronicity and harmony. A publish-subscribe (PubSub) model, well known in prior art, may be appropriate to distribute such a large-scale and comprehensive information across two or more systems to provide sufficient scalability and dynamicity, in which case a database maybe more appropriate than a directory.

Capacity and scalability management of virtualized network functions is well known in prior art as part of cloud computing. There are two types of scalability management techniques known in prior art:

Vertical Scaling: This is essentially resizing a physical platform with more memory, processing and/or bandwidth. It is the ability to increase the capacity of an existing hardware or software by adding more resources. The limiting factor is how big the server can physically get.

Horizontal Scaling: Horizontal scaling affords the ability to scale wider to deal with capacity needs. It is the ability to connect more physical platforms. While vertical scaling can be software configurable if resources are already installed, horizontal scaling can't be implemented at a moment's notice if resources are not already installed since it requires procurement and physical installation.

However, the coupling between the traffic routing within an SDN and capacity management for service chaining in real-time (or run time) is completely unaddressed in prior art. This is because the interrelationship is not yet modeled using an integrated information model as in this invention. A key embodiment of the present invention, called 'Elastic Scaling' is elastically changing a virtualized function's capacity (network-wide or at a specific location) by redistributing the total available capacity of all virtual functions and available, idle physical capacity according to 'instant' needs of traffic flows without performing any vertical or horizontal capacity scaling by increasing physical capacity. A term called 'moving capacity' is used in this patent application to augment the capacity available to a specific virtual service according to the needs of a traffic flow by shifting the location of virtual functions in the network. Convergence gateway, an embodiment of the present invention, associates information about NFV functions (e.g., type, location, physical platform, VM, capacity, current usage) and SDN traffic flows (e.g., route, bandwidth, traffic type, QoS) to determine the best locations to 'move capacity' for elastic scaling.

Embodiments of the present invention are an improvement over prior art systems and methods.

SUMMARY OF THE INVENTION

When network function virtualization (NFV) is overlaid on top of a SDN, a convergence gateway mediates between the orchestrator and the SDN controller. The convergence gateway collects from the orchestrator the information on the location, capacity, status, and usage information of all virtualized functions that run on SDN's physical platforms, and passes that information to the controller. The controller makes a decision to most optimally route a data flow for service chaining by obeying traffic engineering and quality of service policies of that data flow, choosing from available virtualized functions along that route. If one or more specific virtualized function(s) are missing or need capacity upscaling on the chosen optimal route, the controller requests the convergence gateway to perform an 'elastic scaling' to move (or relocate) the missing capacity on the chosen route. If such an elastic scaling is not feasible, the controller looks for an alternate route and repeats the elastic scaling request, and so on. Accordingly, the orchestrator decides precisely where and how to activate/deactivate/capacitate virtual functions to best serve service-chaining requests in real-time. An information model based approach is also presented for information sharing across the orchestrator, convergence gateway and controller.

In one embodiment, the present invention provides a new system comprising: a convergence gateway attached to a controller that is part of a software defined network (SDN), the controller controlling a plurality of network switches that are part of the SDN, with a first virtual function collocated with the first network switch, and a second virtual function collocated with the second network switch; an orchestrator managing the first and second virtual functions, wherein the controller (1) determining an optimal routing path for a traffic flow passing through said first network switch but requiring to visit the second virtual function at first switch location; and (2) sending a request to the convergence gateway to move said second virtual function from second network switch location onto the platform hosting the first virtual function at said first switch location; wherein the convergence gateway sending a request to the orchestrator to instantly move said second virtual function onto said first virtual function's physical platform.

In another embodiment, the present invention provides a convergence gateway further comprising a data collector, which (i) collects data in real-time from the network switches and virtualized functions, and (ii) associates the collected data using an information model; a database, which stores the information model associated with the collected data; a capacity management algorithm, which determines best new locations for virtual functions; an elastic scaling manager, which sends 'move' requests to capacity manager to move physical locations of virtual functions upon demand; a policy manager, which contains policies associated with traffic flows and virtual functions; and a capacity manager, which communicates with the orchestrator for virtual function move requests.

In one embodiment, the present invention provides a method as implemented in a controller attached to a convergence gateway in a software-defined network (SDN), the controller controlling at least a first network switch and a second network switch that are part of the SDN, a first platform hosting a first virtual function collocated with the first network switch and a second platform hosting a second virtual function collocated with the second network switch, an orchestrator managing the first and second virtual functions, the method comprising the steps of: (a) determining an optimal routing path for a traffic flow passing through said first network switch, with the traffic flow requiring to visit the second virtual function at the first network switch; (b) sending a request to the convergence gateway to move the second virtual function at the second platform hosting the second virtual function at the second network switch onto the first platform hosting the first virtual function at the first switch location, wherein the convergence gateway forwards the request to the orchestrator which moves the second virtual function at the second platform hosting the second virtual function at the second network switch onto the first platform hosting the first virtual function at the first switch location.

In another embodiment, the present invention provides a system comprising: (a) a controller attached to a convergence gateway in a software-defined network (SDN), the controller controlling at least a first network switch and a second network switch that are part of the SDN, (b) a first platform hosting a first virtual function collocated with the first network switch; (c) a second platform hosting a second virtual function collocated with the second network switch, (d) an orchestrator managing the first and second virtual functions, and wherein the controller: determines an optimal routing path for a traffic flow passing through said first network switch, with the traffic flow requiring to visit the second virtual function at the first network switch; and sends a request to the convergence gateway to move the second virtual function at the second platform hosting the second virtual function at the second network switch onto the first platform hosting the first virtual function at the first switch location, and wherein the convergence gateway forwards the request to the orchestrator which moves the second virtual function at the second platform hosting the second virtual function at the second network switch onto the first platform hosting the first virtual function at the first switch location.

In another embodiment, the present invention provides an article of manufacture comprising non-transitory computer storage medium storing computer readable program code which, when executed by a computer, implements a method as implemented in a controller attached to a convergence gateway in a software-defined network (SDN), the controller controlling at least a first network switch and a second network switch that are part of the SDN, a first platform hosting a first virtual function collocated with the first network switch and a second platform hosting a second virtual function collocated with the second network switch, an orchestrator managing the first and second virtual functions, the medium comprising: (a) computer readable program code determining an optimal routing path for a traffic flow passing through said first network switch, with the traffic flow requiring to visit the second virtual function at the first network switch; (b) computer readable program code sending a request to the convergence gateway to move the second virtual function at the second platform hosting the second virtual function at the second network switch onto the first platform hosting the first virtual function at the first switch location, wherein the convergence gateway forwards the request to the orchestrator which moves the second virtual function at the second platform hosting the second virtual function at the second network switch onto the first platform hosting the first virtual function at the first switch location.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
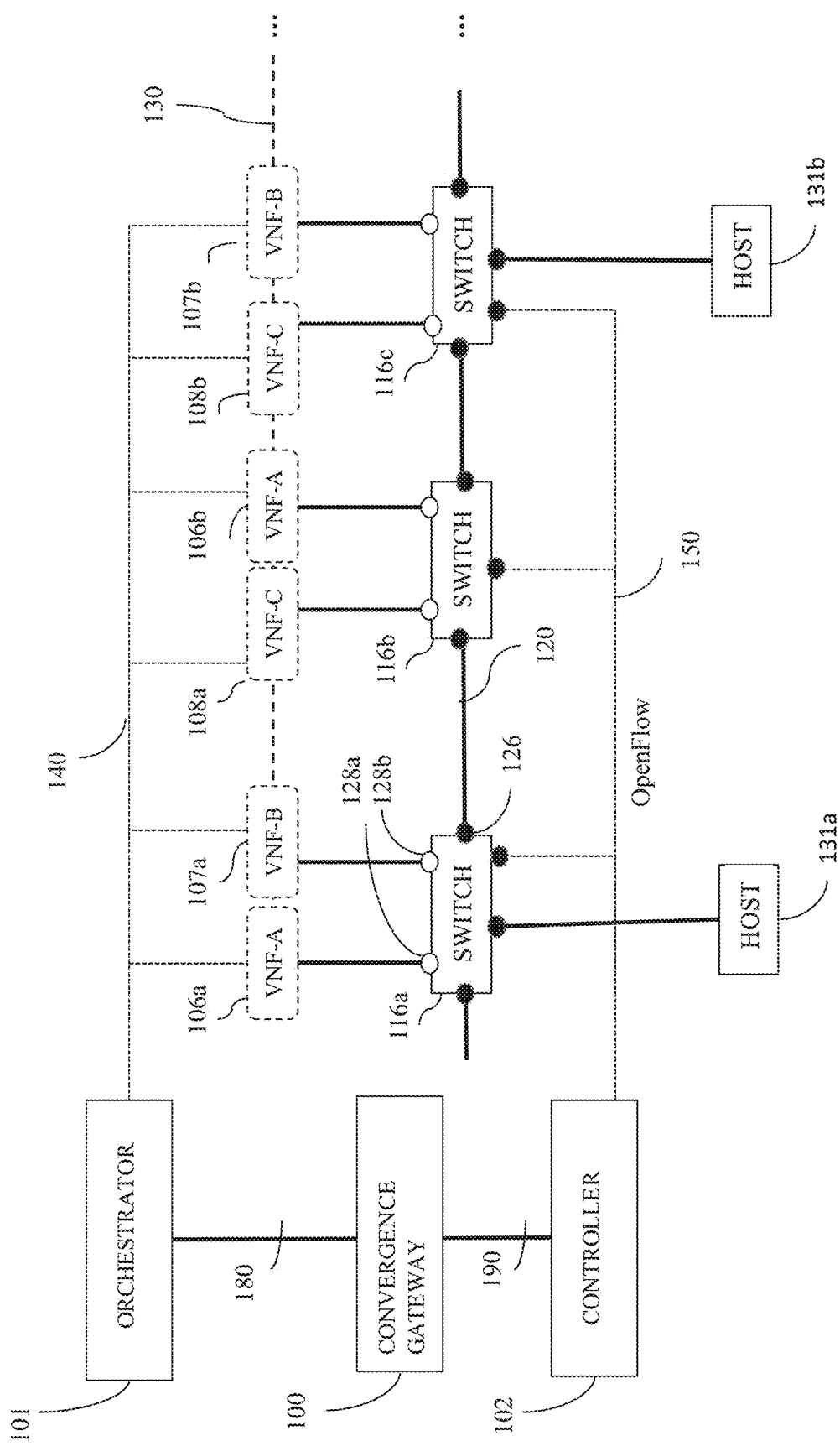
FIG. 1 is an exemplary 3-node SDN network and NFV infrastructure integrated with the system of invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated.

Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device (e.g., a router, switch, orchestrator, hardware platform, controller etc.) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device such as a switch, router, controller, orchestrator, server or convergence gateway is a piece of networking component, including hardware and software that communicatively interconnects with other equipment of the network (e.g., other network devices, and end systems). Switches provide network connectivity to other networking equipment such as switches, gateways, and routers that exhibit multiple layer networking functions (e.g., routing, bridging, VLAN (virtual LAN) switching, layer-2 switching, Quality of Service, and/or subscriber management), and/or provide support for traffic coming from multiple application services (e.g., data, voice, and video). Any physical device in the network is generally identified by its type, ID/name, Medium Access Control (MAC) address, and Internet Protocol (IP) address.

Note that while the illustrated examples in the specification discuss mainly NFV (as ETSI defines) relying on SDN (as Internet Engineering Task Force [IETF] and Open Networking Forum [ONF] define), embodiments of the invention may also be applicable in other kinds of distributed virtualized network function architectures and programmable network architectures, not necessarily tied to NFV and SDN.

According to an aspect of this invention, any physical platform that is currently configured to host a set of VNFs can instantly be transformed into a platform of other VNFs. Moving in a VNF may (or may not) cause moving out an existing VNF on that platform to another location upon quality of service requirements and traffic conditions in the network, resulting in a dynamic VNF graph of the network modified according to traffic needs as opposed to a static graph as in prior art. The determination and selection of an optimal physical location of such platforms on which to place the VNFs, depending on network conditions and various business parameters such as cost, performance, and user experience, is what we call elastic scaling in this patent application. In fact, there are other conditions such as emergencies (earthquakes, tsunamis, floods, wars, etc.) that may require hauling of major blocks of VNFs to other regions/parts of the physical networks, in which case the NFV network infrastructure and topology changes completely. All these facts create an important need for NFV-aware operations within an SDN and SDN-aware operations in NFV both of which are the topics of this invention.

In an embodiment of this invention, system called convergence gateway, and a method is deployed that mediates between (a) the orchestrator, which controls and monitors VNFs, and (b) the SDN controller, which controls network routing and monitors physical network performance. Convergence gateway acts essentially as an adaptation-layer enabling the minimal level of coupling between the two infrastructures that share information without necessarily sharing all resource data of their respective domains. Particularly, in service function chaining wherein VNFs are located in different places in the network, the mediation described in this invention allows the locations of VNFs to be shifted in real-time to meet a desired SDN routing graph, such as shortest path.

Another creative aspect of the convergence gateway is that it exploits an efficient information model shared between the orchestrator and controller to mutually trigger changes knowing one another's infrastructure. In one embodiment, the information model is derived from prior art Common Information Model (CIM). According to one aspect of this invention, the information model of convergence gateway associates each VNF in the SDN to a specific Virtual Machine (VM), and a physical device (e.g. server) at a network node at a specific location (country/city/location/data center/floor/rack).

One of the key issues in running virtualized network functions in an SDN is to manage capacity needs of virtual functions in real-time or near real-time by augmenting and shifting a specific function's capacity to another one's needs without installing new physical platforms. The mapping between a virtualized function and the actual physical device that is hosting the function is therefore said to be elastic (i.e. variable) according to an aspect of this invention. Various exemplary elastic scaling activities according to this invention are as follows:

Activate a virtual machine within a physical platform to host one or more virtual functions;
    'Move out' a virtual function from a physical platform;
    'Move in' a virtual function into a physical platform;
    Increase capacity of a virtual function on the same physical platform;
    Decrease capacity of a virtual function on the same physical platform;

Such exemplary elastic scaling activities have to be performed in conjunction with traffic engineering in order to meet traffic's performance requirements (such as latency, security, etc.), which are significantly affected by where in the network a virtual function is executed. Even regulatory constraints may play a critical role. A policy engine implemented within the convergence gateway is where such traffic engineering constraints are stored and executed, which indirectly guide elastic scaling activities.

In patent application US20160366023, a reference system is devised to map a virtual function to an actual physical device using a so-called 'referent identifier' data indicative of physical location of the hosting physical device. Furthermore, it proposes a monitoring system that can receive from each physical device in the network data associated with the virtual functions it hosts. When virtual functions are manually moved, the monitoring system receives information about the physical device concerning the move of the virtual function. It also can receive idle capacity from each physical device. However, US20160366023 does not teach how these virtual functions are moved and more generally how the virtual functions' capacity is managed in concert with traffic engineering.

US20140229945 A1 proposed an addressing scheme (special identifiers) above the hardware layer providing identities to the virtual machines hosting virtual functions within an SDN. However, this patent only addresses the addressing (information modeling) of virtual machines. The capacity management aspect has not been addressed.

US20140351430 A1 describes a cloud computing capacity management system when server resources are distributed across a network. While the proposed system provides recommendations for capacity augmentation, it does not describe how the underlying physical communications network such as an SDN is taking into account in decision-making, Furthermore, it does not teach how such capacity augmentation recommendations will be executed in real-time within the network.

Patent application US20160080263 A1 describes a method for service chaining in an SDN in which a user's service request is derived by the controller from a specific service request packet, which is forwarded by the ingress switch to the controller in a packet-in message. Using a database with a service table, a user table, and a virtualized network functions table, which are all statically associated with one another, the controller determines the forwarding of user's packet. The orchestrator may send updated information on virtualized functions to the controller. However, this patent application does not teach a system that mediates between the orchestrator and controller allowing two-way communications. It does not teach how the controller dynamically selects from a pool of VNFs in the network that is offering the same service.

FIG. 1 illustrates a simple three-node SDN with an overlaid NFV infrastructure in which the system of invention is deployed. The network is comprised of several VNFs actively operating in a network node (these VNFs may physically reside on the switch hardware or on adjunct platforms that directly connect to the switch). There are three different types of virtualized network functions, namely VNF-A (Encryptor), VNF-B (Load Balancer) and VNF-C (Network Address Translator) which are distributed across three switching nodes: Switching node 116a hosts VNF-A 106a and VNF-B 107a, switching node 116b hosts VNF-C 108a and VNF-A 106b, and switching node 116c hosts VNF-C 108b and VNF-B 107b. Note that orchestrator 101 manages VNFs 106a,b, 107a,b and 108a,b using MANO interface 140, while controller 102 manages network switches 116a, 116b and 116c using south-bound interface (e.g., OpenFlow) 150. Convergence gateway 100, the system of the invention, is attached to both orchestrator 101 and controller 102, with network connections 180 and 190, respectively. Physical platforms (hosts) 131a and 131b are attached to switches 116a and 116c, respectively, receiving both transport (routing) and services (NAT, Encryption, etc.) from the network. Hosts are personal computers, servers, workstations, super computers, cell phones, etc. On switch 116a, NIC 126, and VNIC 128a,b, which virtually connect VNF-A and VNF-B to the switch are illustrated. VNIC 128a and 128b have unique IP addresses and physically map a NIC on the switch such as NIC 126. Also shown, in FIG. 1 is facility 120 that interconnects switches 116a and 116b. For the sake of simplicity, not all ports and facilities are labeled. According to an aspect of this invention, the IP address of a VNIC, which is the address of that specific VNF (or the network location identifier) is dynamically changed since a VNF can move out of a physical platform and move into another physical platform.

Figure 2:
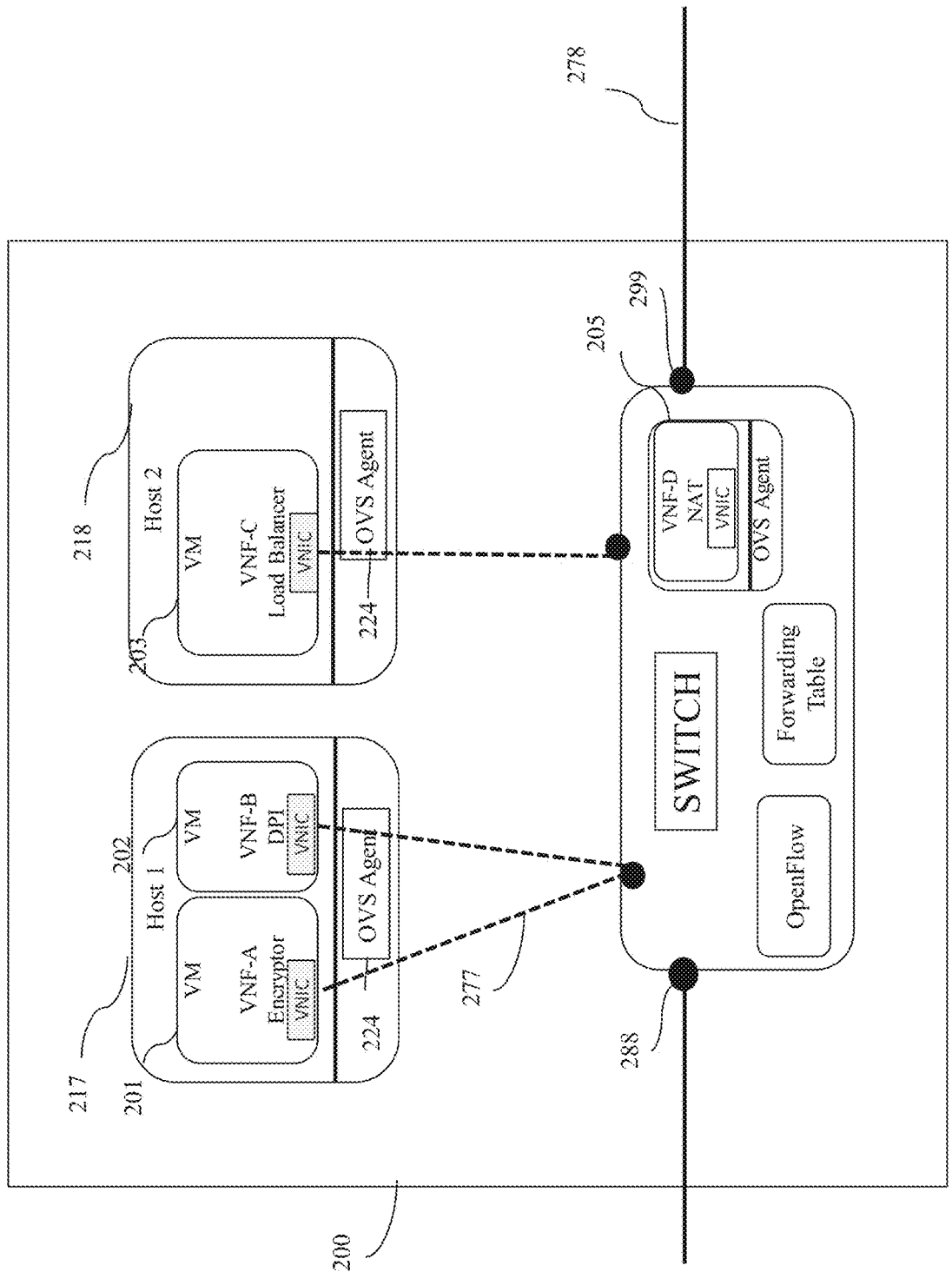
FIG. 2 illustrates a network node with VNFs implemented on two separate physical platforms.

FIG. 2 illustrates an example network node 200 with co-residents VNF-A 201, VNF-B 202, VNF-C 203 and VNF-D 205. VNF-A 201 and VNF-B 202 reside on host 217, VNF-C 203 on host 218, and VNF-D 205 on network switch 200. Hosts 217 and 218 and the network switch are all running an OVS agent creating on-board virtual machines (VMs) which are containers on which these functions run. Each function has a VNIC. Switch 200 has two physical NICs, 288 and 299. Facility 278 attaches to port 299.

Figure 3:
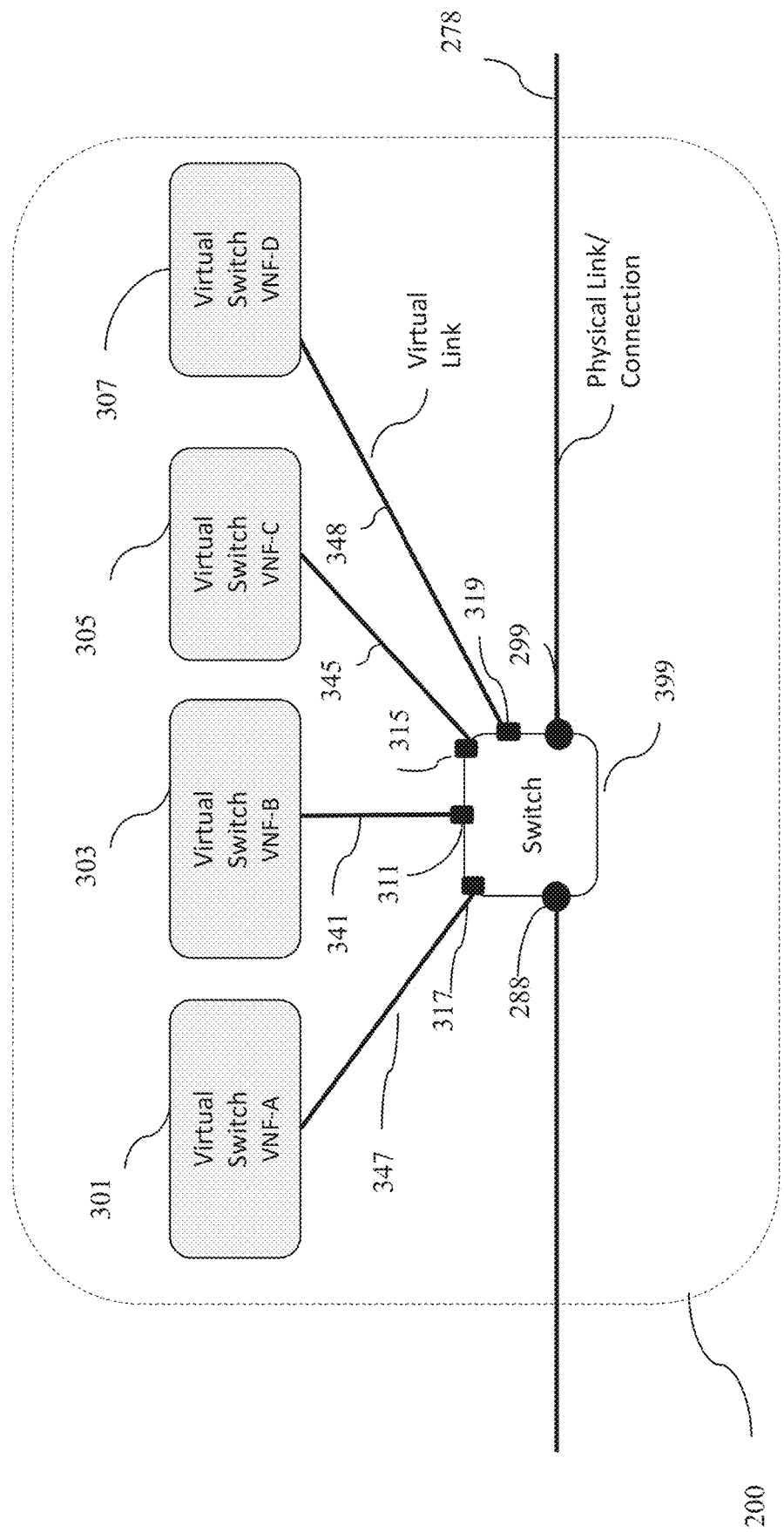
FIG. 3 illustrates modeling of a network node, which is used for traffic routing with service chaining.

FIG. 3 illustrates an embodiment of a simple model to map VNFs into the world of SDN. Each VNF residing on a physical network resource is represented with a virtual port, and a virtual NIC (VNIC) that has a unique IP address. Doing so, any SDN switch with one or more active VNF functions is basically converted into two-tiers, wherein the switch in the center is tier-1 and represents the network switch with many NICs and associated MAC-IP addresses. Each individual VNF function is at tier-2 and modeled with a 'virtual link' forming a star topology as illustrated in FIG. 3. Each co-resident VNF attaches to the center switch with a VNIC signifying the termination of the virtual link on the network switch. The length of a virtual link is assumed to be infinitesimal. These new concepts will be used forming the forwarding graph and the associated forwarding rules. The integration of VNF into SDN with a virtual port enables us to map capacity parameters of VNFs (such as CPU utilization, RAM usage, processing load, etc.) onto network parameters such as:

VNF with a heavy workload as a 'congested link',
VNF with a light workload as an 'idle link',
VNF with a high processing capacity as a 'high capacity link',
VNF with small processing capacity as a 'low capacity link',
The closest VNF to a switch distance wise is its local VNF.

This simple modeling allows the routing across VNFs to be treated just like routing across a physical switched network with switches and connections. A packet flow entering the switch (the physical resource) first travels the center switch in which a forwarding action for that flow is typically specified. If there are no VNF applicable to that specific flow, then the flow is sent directly to an outgoing port of the switch towards the next hop switch according to a forwarding rule specified by the controller. Otherwise, the packet flow traverses one or more virtual switches, in a specific order according to requested service chaining, before getting out, and then back to the center switch in which there is the forwarding action towards the next hop network switch. The key distinction between a virtual switch and the network switch is that while the network switch performs forwarding according to rules provided by the controller between any of its physical port pair, the virtual switch has only a single port (aka VNIC) through which it can receive and send traffic.

Using the concepts described above, VNF-A, B, C and D are modeled as virtual switches 301, 303, 305 and 307, respectively in FIG. 3. These switches attach to center switch 399 with links 347, 341, 345, and 348 at VNICs 311, 315, 317 and 319. The topology of the equivalent two-layer network node 200 is illustrated. Note that center switch 399 has two NICs (288 and 299) and four VNICs (311, 315, 317 and 319) to forward traffic across.

In one embodiment, the SDN controller needs to know the complete topology of the network with the physical and virtual resources and their associations; it has to receive information about the location, capacity and current status of VNFs from the orchestrator through the system of invention. Similarly, the orchestrator needs to know about the current status of network so that it can activate/deactivate VNFs according to current network conditions using elastic scaling techniques outlined in this patent application.

The convergence gateway may be directly connected to the orchestrator and controller so that it can receive periodic or event-driven data updates from these two systems. Alternatively, it may use a bus-based interface for a publish-subscriber based data sharing. The convergence gateway can be modeled as a simple secure database with interfaces to the two systems, and a dictionary that translates data elements from one information model to another, if the two systems use different information models.

Figure 4:
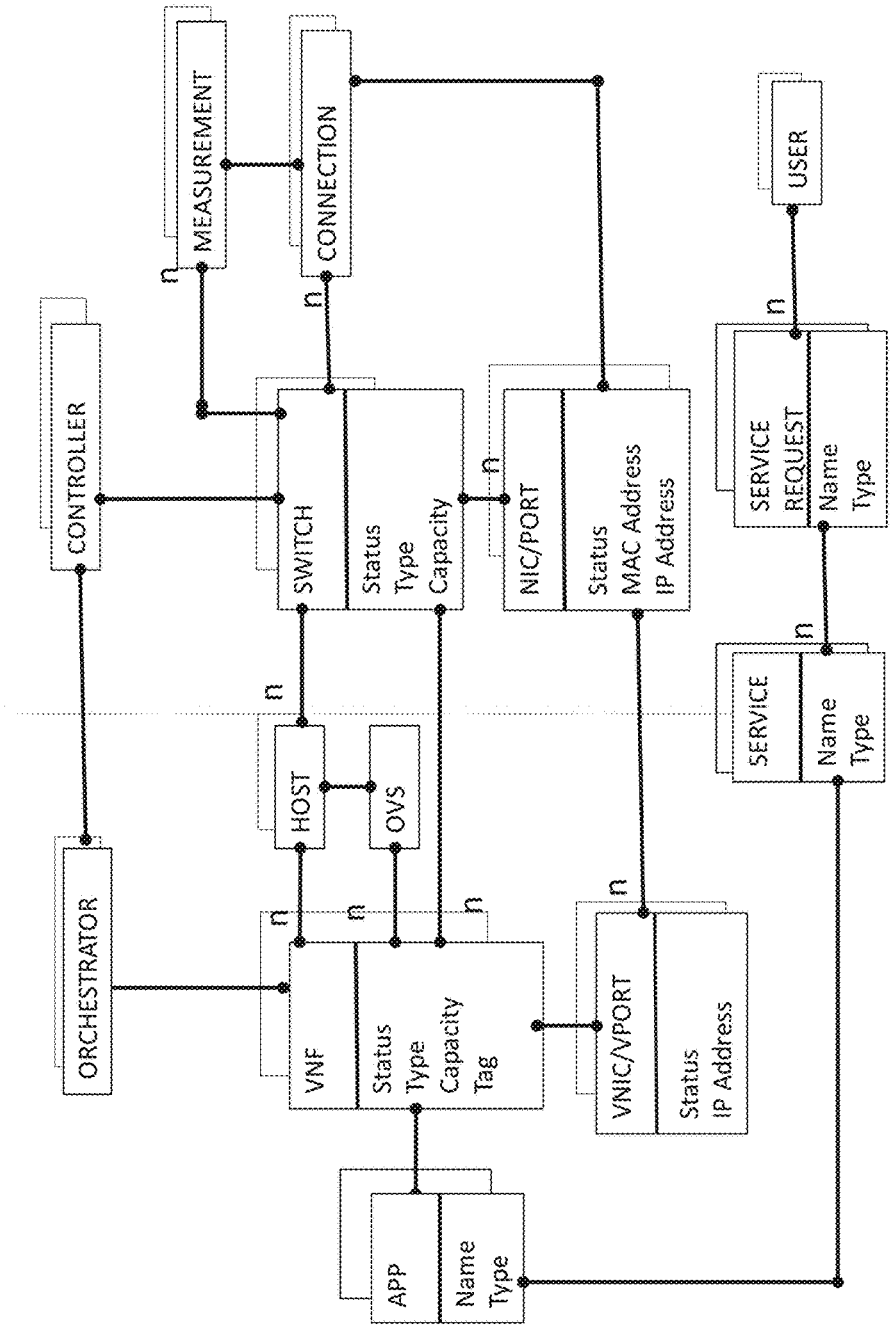
FIG. 4 illustrates an exemplary information model of the convergence gateway.

In FIG. 4, a simplified diagram of key information model components stored in the convergence gateway is illustrated. The objects shown on the right-hand side are obtained directly from the SDN controller (and hence physical network related) and those on the other side are obtained from the orchestrator (and hence virtual services related). A few key attributes of each object are also illustrated just to ease the understanding of the object. The relationships between the objects are shown as possible examples as well. Note that the controller has an object called 'service request' which is comprised of several service elements, and tied into a user. Similarly, 'service' object exists in the orchestrator and ties into many VNFs spread across the SDN. Each VNF is associated with a VPORT (or VNIC), which is in turn associated with a PORT (or NIC) in a physical resource. Switch, Connection and PORT are linked, while a host is linked to a user for a simple model. The VNF to VNIC association is altered when the VNF capacity is completely moved out or moved in.

Figure 5A:
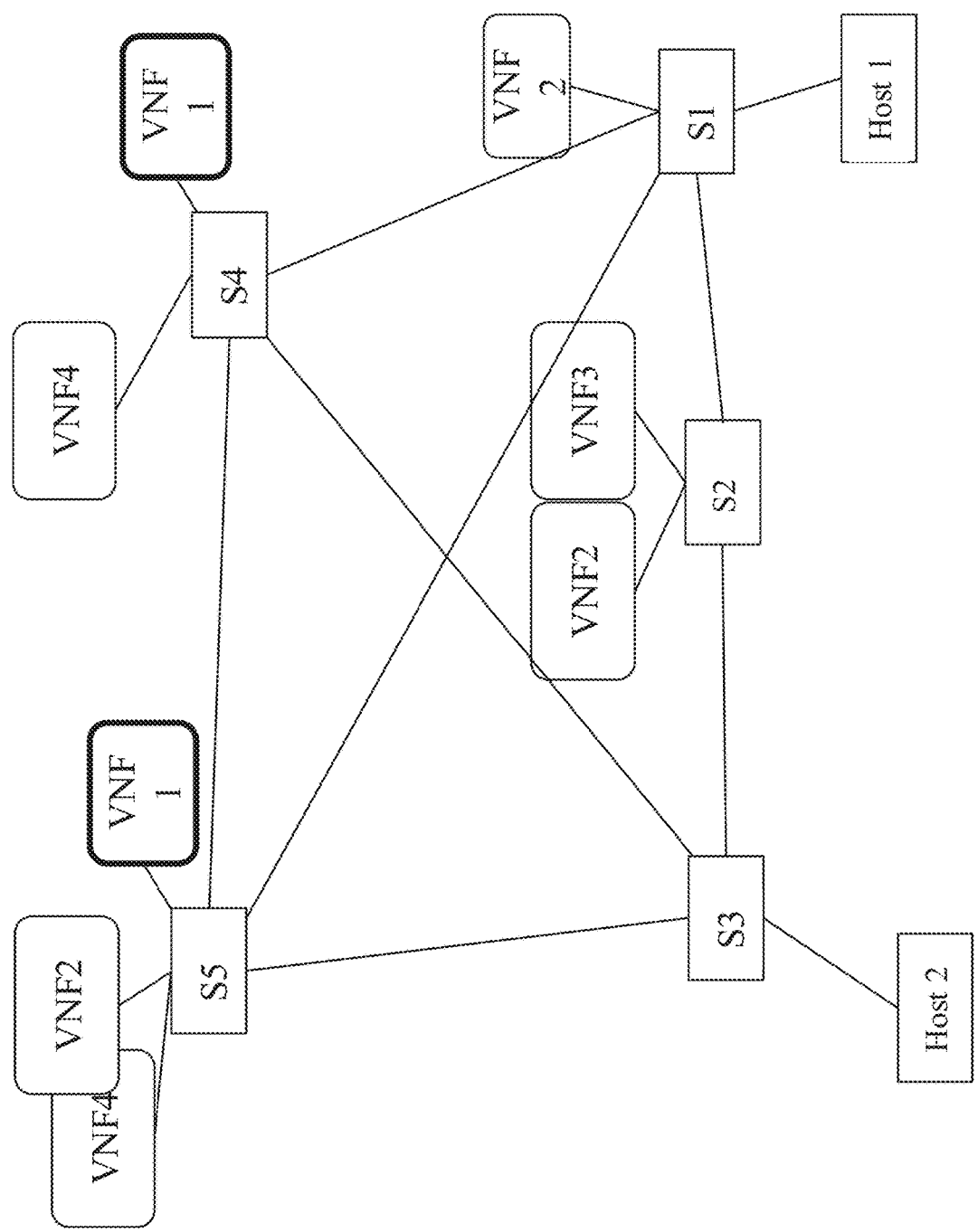
FIGS. 5A and 5B illustrate the 'move' method of invention.
Figure 5B:
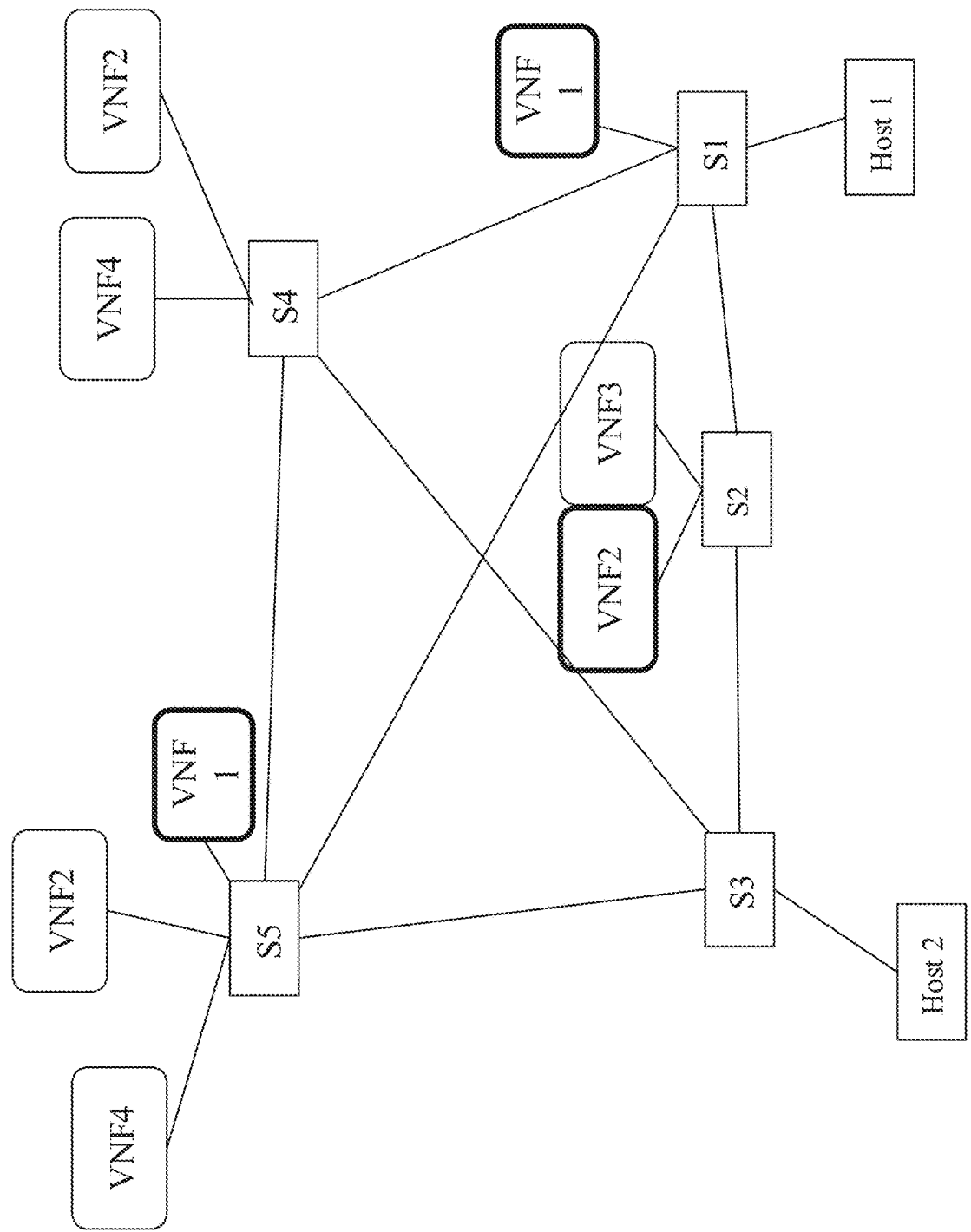

Elastic scaling is illustrated in FIGS. 5A and 5B. An exemplary data flow between host 1 and host 2 requires VNF's service. The SDN controller determines that shortest path for the flow is S1-S2-S3 according to FIG. 5A. However, this path does not have VNF1. The controller requests from convergence gateway that VNF1 collocated with S4 moves onto the physical platform hosting VNF2 at the network node of S1. Convergence gateway in turn (1) checks to determine if the capacity of the physical platform can or cannot host both VNF1 and VNF2; (2) determines to move out VNF2 or reduce the capacity assigned to VNF2 to make room for VNF1; (3) sends a message to the orchestrator to implement these changes.

Figure 6A:
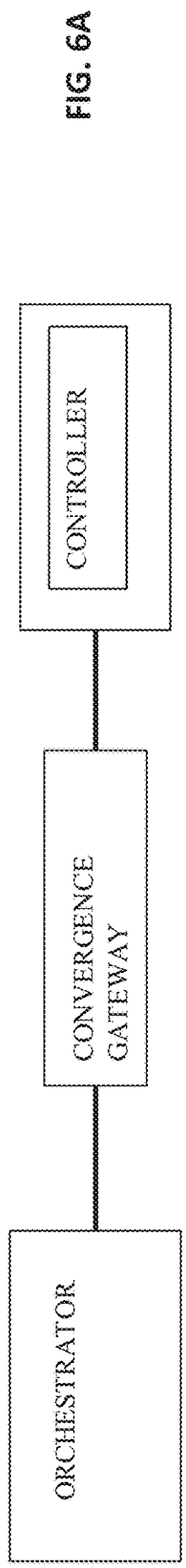
FIGS. 6A-6D illustrate different embodiments of the convergence gateway.
Figure 6B:
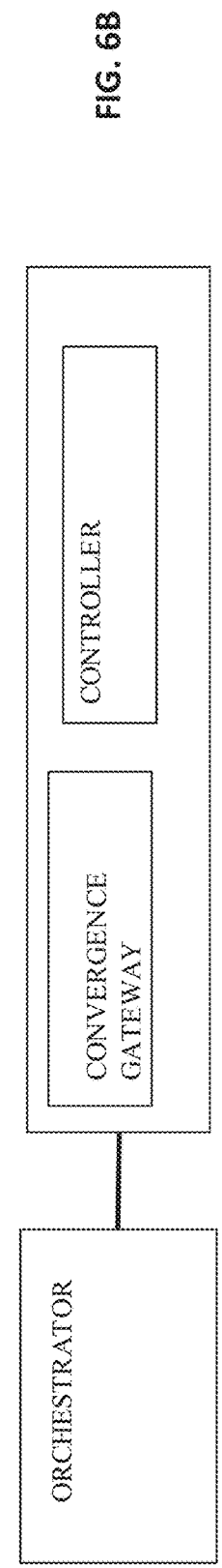
Figure 6C:
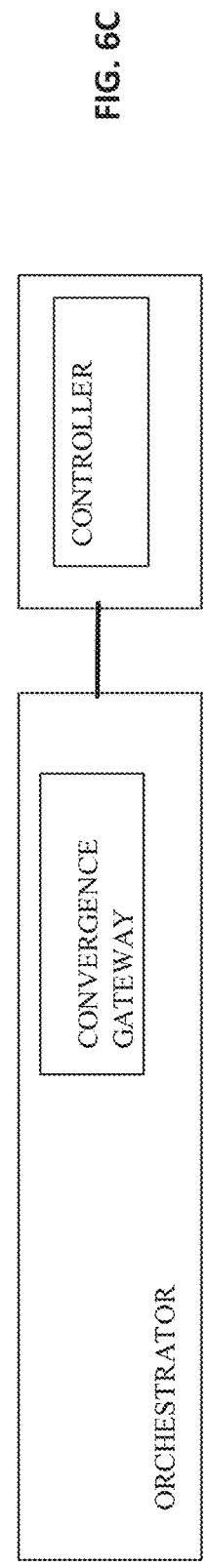
Figure 6D:
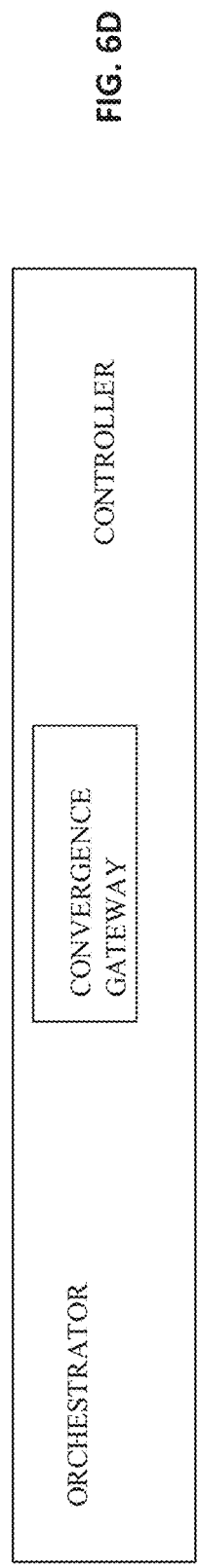

There are various embodiments of the convergence gateway as illustrated in FIGS. 6A-6D. Although it can be implemented as a standalone component attached to the orchestrator and controller via external interfaces as shown in FIG. 6A, it can also be an integral part of the orchestrator or the controller as illustrated in FIG. 6B and FIG. 6C. The interfaces of the convergence gateway are secure interfaces, using, for example, TCP/TLS. FIG. 6D illustrates an embodiment of an 'all-in-one-box' wherein controller, orchestrator and convergence gateway are implemented on the same hardware.

Figure 7:
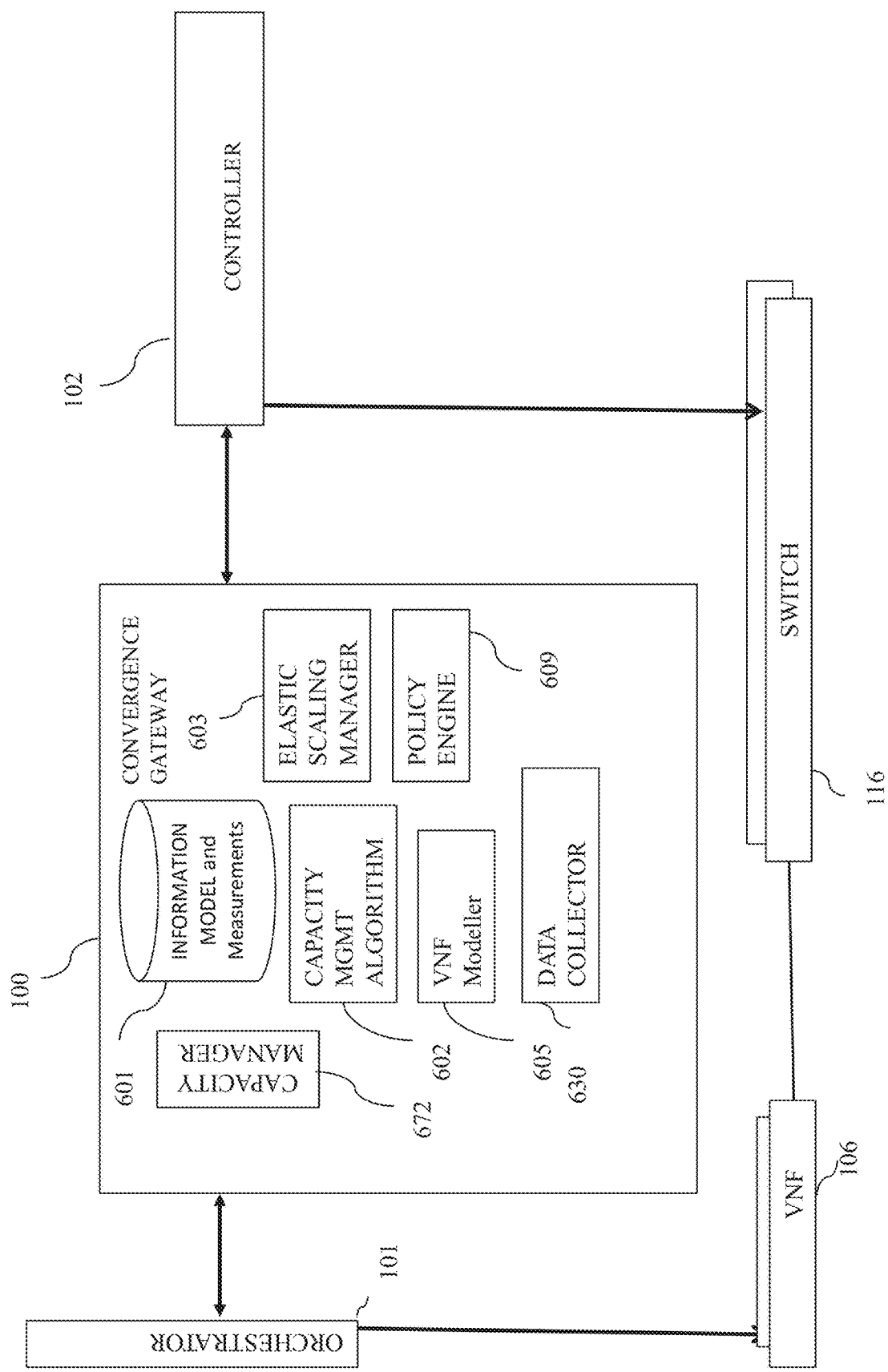
FIG. 7 depicts a block diagram of the system of invention.

FIG. 7 shows an exemplary embodiment of controller 102 with resident convergence gateway functionality 100. The Convergence Database 601 stores the information model. The information is refreshed as there are changes in the network. VNF Modeller 605 maps each active VNF into a so called 'virtual switch' or a 'virtual link', and feeds it into topology manager 607 to extend the network topology to incorporate the NFV functionality. The overall network topology with network nodes that contain network switches and 'virtual switches' are stored in database 667. The virtual switch topology is essentially overlaid on top of the physical network topology. The topology database also has other topological information such as the grouping of the virtual switches according to the type of service they provide, and the status of each network switch and virtual switch.

Capacity Manager 672 feeds information to the Orchestrator when the VNF capacity has to be increased or shifted to other parts of the SDN when there is a sustained major network congestion and/or catastrophic event impacting certain network nodes or facilities. Capacity Manager 672 within convergence gateway 100 has three related sub-functions (1) elastic scaling capacity manager 603, (2) policy engine 609, and (3) capacity management algorithm 602. Elastic scaling capacity manager is where a decision is made as to 'move' a VNF during a live traffic flow according to a policy stored in policy engine. An elastic capacity management action is usually initiated when a calculated traffic route for a flow with service chaining violates a policy. Measurements of VNFs are collected by Data Collector 630 using MANO, and stored in Convergence Gateway 100 database.

The need for an elastic scaling action happens before, during or after a traffic flow. The convergence gateway sends a 'move (out/in) request' message to MANO function of the orchestrator, which then initiates capacity management actions such as the virtual function activation/deactivation/augmentation/reduction. The 'move' can take various forms:

(i) from idle physical capacity to the capacity requiring VM within the same network node;

(ii) from one VM capacity to the capacity requiring VM within the same physical server, i.e., without changing the final destination of the flow routing within the SDN;

(iii) from one physical server to another physical server which has higher capacity by changing the network routing of the flow.

The real-time capacity management decision sequentially tries (i), (ii) and (iii) in order of feasibility. If a specific constraint (delay, capacity etc.) of the flow is not met, the physical capacity is redistributed within the same server in the same network node initially. If such a redistribution does not provide the required capacity, the flow is then rerouted towards the same virtual function located at another place. Elastic scaling manager first runs capacity management algorithm to determine best 'move out and move in capacity' actions.

Prior-art shortest path routing techniques, which are algorithmic, would be directly applicable to determine the best path for a data flow across many switches and VNFs. Given the problem in hand is NP-complete, the algorithms that may simply enumerate several feasible alternative paths and select the one solution that satisfies the optimal value for a specific cost function can be used. The routing algorithm can consider, for example, each VNF's processing capacity as a constraint on the virtual link. When a VNF is congested, the algorithm must avoid using it, just like avoiding congested facilities.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of a system and method for elastic scaling of virtualized network functions over a software defined network. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A system comprising:
a controller attached to a convergence gateway in a software-defined network (SDN), the controller controlling at least a first network switch and a second network switch that are part of the SDN,
a first platform hosting a first virtual function collocated with the first network switch;
a second platform hosting a second virtual function collocated with the second network switch;
an orchestrator managing the first and second virtual functions;
a data collector, which (i) collects topology and capacity data from network switches and topology and capacity data of virtual functions, in real-time in the SDN, and (ii) associates the collected data and their attributes using an information model;
a database, which stores the information model associated with the collected data;
a capacity management algorithm, which algorithmically determines new locations for virtual functions;
an elastic scaling manager, which sends 'move' requests to a capacity manager to move physical locations of virtual functions;
a policy manager, which contains policies associated with traffic flows and virtual functions; and
the capacity manager, which communicates with the orchestrator virtual function for move requests;
wherein the controller: (a) determines an optimal routing path for a traffic flow passing through said first network switch, with the traffic flow requiring to visit the second virtual function at the first network switch; (b) sends a request to the convergence gateway to move the second virtual function at the second platform hosting the second virtual function at the second network switch onto the first platform hosting the first virtual function at the first switch location, and
wherein the convergence gateway: (1) collects and stores data pertaining to one or more virtual functions associated with each of the network switches in the SDN, the data comprising any of, or a combination of, the following: physical platform identifier hosting the virtual function, location associated with each virtual function, capacity associated with each virtual function, usage associated with each virtual function, and congestion status associated with each virtual function, and (2) forwards the request to the orchestrator which moves the second virtual function at the second platform hosting the second virtual function at the second network switch onto the first platform hosting the first virtual function at the first switch location.

2. The system of claim 1, wherein the capacity management algorithm selects network switches for virtual function moves by minimally deviating from an optimal routing path calculated by the convergence gateway.

3. The system of claim 1, wherein the capacity management algorithm selects network switches for virtual function moves by avoiding congested paths, switches and physical platforms.

4. An article of manufacture comprising non-transitory computer storage medium storing computer readable program code which, when executed by a computer, implements a method as implemented in a controller attached to a convergence gateway in a software-defined network (SDN), the controller controlling at least a first network switch and a second network switch that are part of the SDN, a first platform hosting a first virtual function collocated with the first network switch and a second platform hosting a second virtual function collocated with the second network switch, an orchestrator managing the first and second virtual functions, the medium comprising:
(a) computer readable program code determining an optimal routing path for a traffic flow passing through said first network switch, with the traffic flow requiring to visit the second virtual function at the first network switch;
(b) computer readable program code sending a request to the convergence gateway to move the second virtual function at the second platform hosting the second virtual function at the second network switch onto the first platform hosting the first virtual function at the first switch location;
(c) computer readable program code implementing a data collector, the data collector (i) collecting topology and capacity data from network switches and virtual functions in the SDN, and (ii) associating the collected data and their attributes using an information model;
(d) computer readable program code implementing a database, which stores the information model associated with the collected data;
(e) computer readable program code implementing a capacity management algorithm, which algorithmically determines new locations for virtual functions;
(f) computer readable program code implementing an elastic scaling manager, which sends 'move' requests to a capacity manager to move physical locations of virtual functions;
(g) computer readable program code implementing a policy manager, which contains policies associated with traffic flows and virtual functions;
wherein the capacity manager communicates with the orchestrator virtual function for move requests; and
wherein the convergence gateway: (1) collects and stores data pertaining to one or more virtual functions associated with each of the network switch in the SDN, the data comprising any of, or a combination of, the following: physical platform identifier hosting the virtual function, location associated with each virtual function, capacity associated with each virtual function, usage associated with each virtual function, and congestion status associated with each virtual function, and (2) forwards the request to the orchestrator which moves the second virtual function at the second platform hosting the second virtual function at the second network switch onto the first platform hosting the first virtual function at the first switch location.

\* \* \* \* \*